United States Patent

Ahrens et al.

[15] 3,649,108

[45] Mar. 14, 1972

[54] SERIAL SECTION PHOTOGRAPHY OF ORGANIC MATERIAL

[72] Inventors: Robert H. Ahrens, Milwaukee; John A. Bartlett, Pewaukee; James S. Roberts, Brookfield; Pieter W. Schipper, Elm Grove, all of Wis.; Roy Mills, Cardiff, Calif.

[73] Assignee: Milwaukee Chaplet & Mfg. Company, Inc., Milwaukee, Wis.

[22] Filed: Nov. 13, 1969

[21] Appl. No.: 876,329

[52] U.S. Cl................................352/84, 35/20, 35/51, 83/567, 118/315, 352/131
[51] Int. Cl..................................................G03b 41/00
[58] Field of Search....................352/84, 131, 39; 83/915.5, 83/567, 267; 35/20, 51

[56] References Cited

UNITED STATES PATENTS

| 2,444,729 | 7/1948 | Crockwell | 352/39 |
| 2,614,454 | 10/1952 | Steffen | 352/39 |
| 3,459,079 | 8/1969 | DeGain | 83/267 X |

Primary Examiner—Louis R. Prince
Assistant Examiner—Joseph W. Roskos
Attorney—Wheeler, House & Wheeler

[57] ABSTRACT

Successive sections are taken from animal or botanical material embedded in a supporting block. The block is then indexed rotatably step by step. In the several indexed positions of the block, the work surface from which the section has been removed is washed and stained and photographed and the block is advanced radially toward the knife for further sectioning and for staining and photographing each newly exposed surface. In each cycle the block is raised for indexing and lowered to engage matched face splines for precision registration with the camera. Preferably automatic exposure of a small predetermined number of frames of motion picture film follows each sectioning and staining of the work, whereby the resulting film not only records the successive exposed surfaces but may be projected to give the impression that the observer is actually moving through the work, thus permitting the investigator to trace selected elements (vascularity, neural bundles, anatomical structure, etc.) through an organ or other specimen while maintaining visual positional reference to other anatomical features.

11 Claims, 27 Drawing Figures

Patented March 14, 1972

INVENTORS
ROBERT H. AHRENS, JOHN A. BARTLETT
JAMES S. ROBERTS, PIETER W. SCHIPPER
ROY MILLS

BY Wheeler, Wheeler, House & Clemency
ATTORNEYS

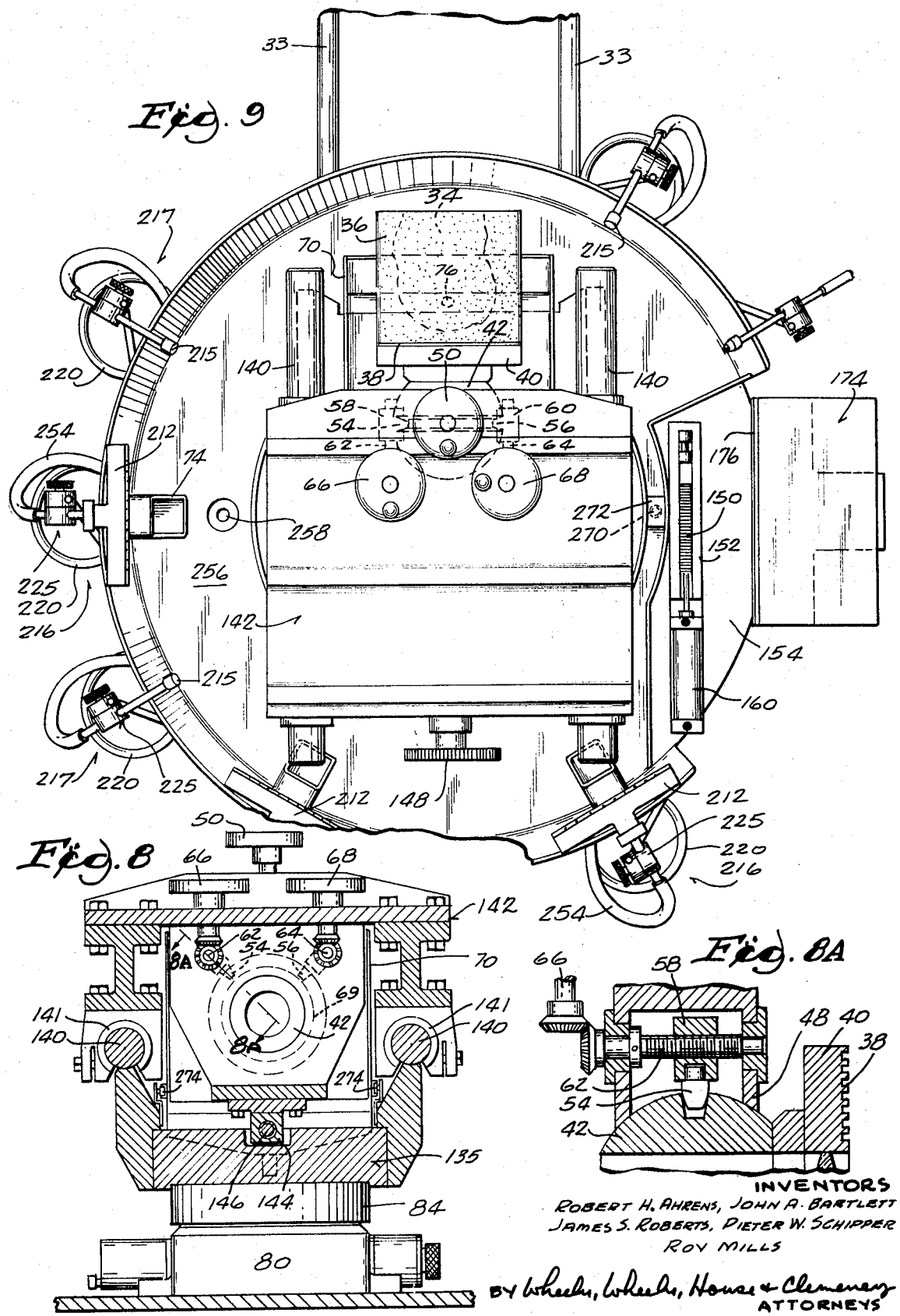

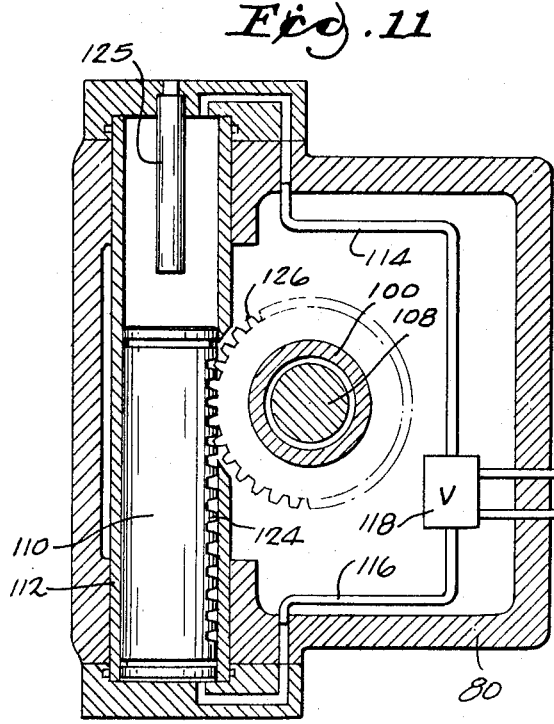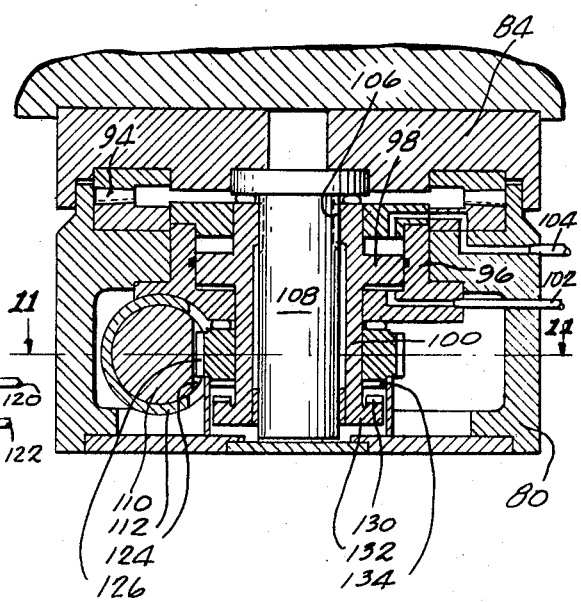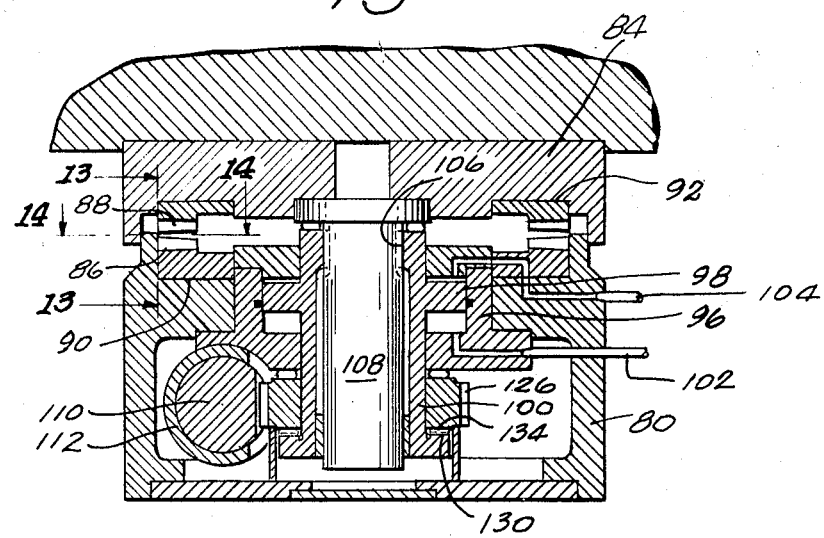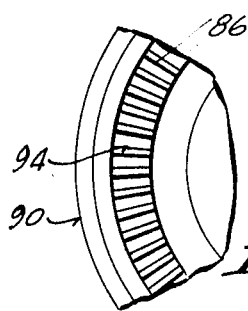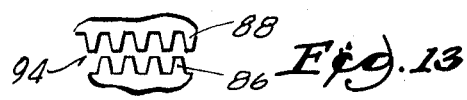

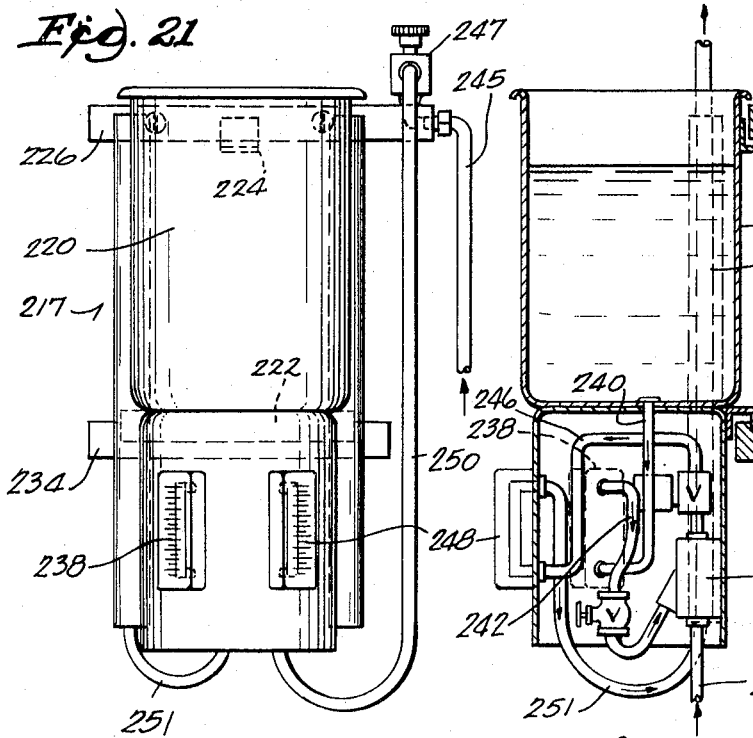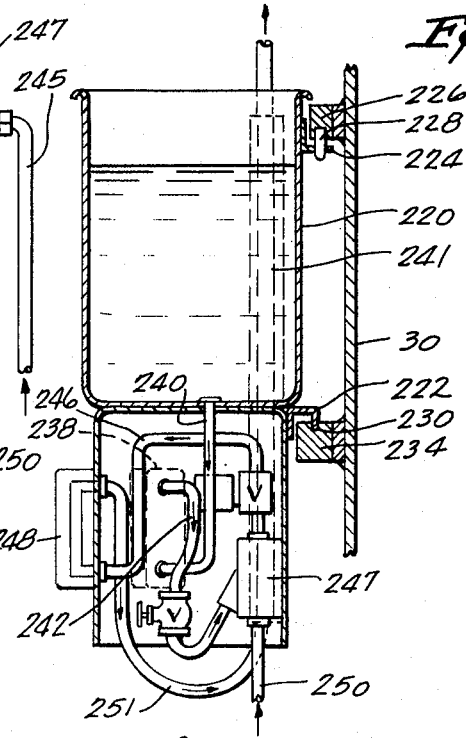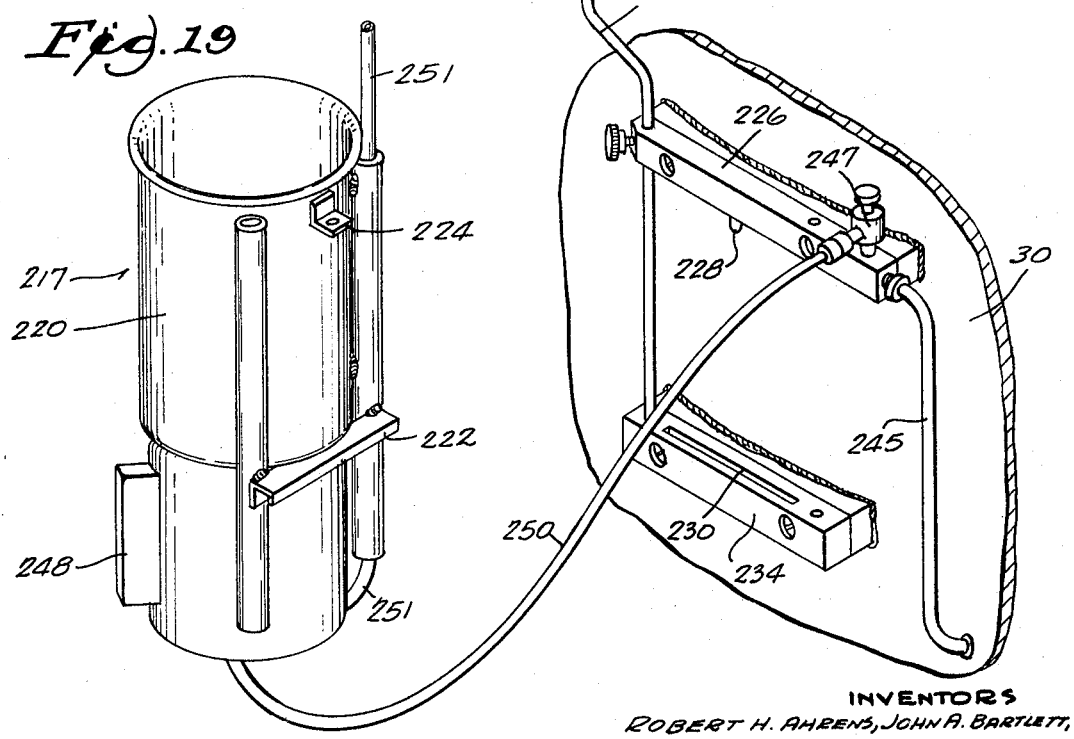

Patented March 14, 1972
3,649,108
9 Sheets-Sheet 8
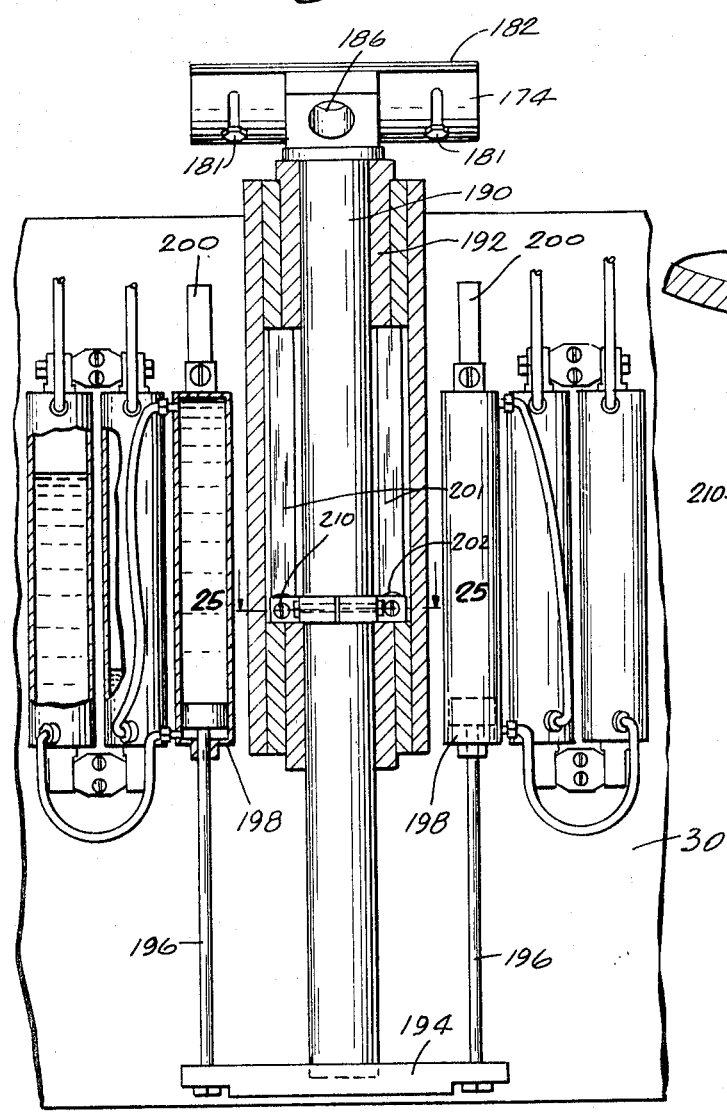
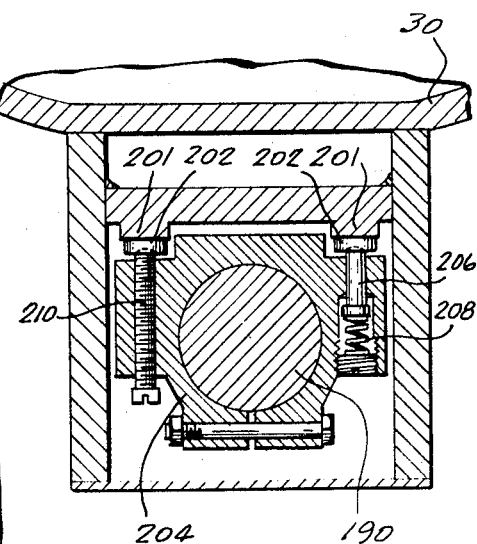
INVENTORS
ROBERT H. AHRENS, JOHN A. BARTLETT,
JAMES S. ROBERTS, PIETER W. SCHIPPER
ROY MILLS
BY Wheeler, Wheeler, House & Clemency
ATTORNEYS

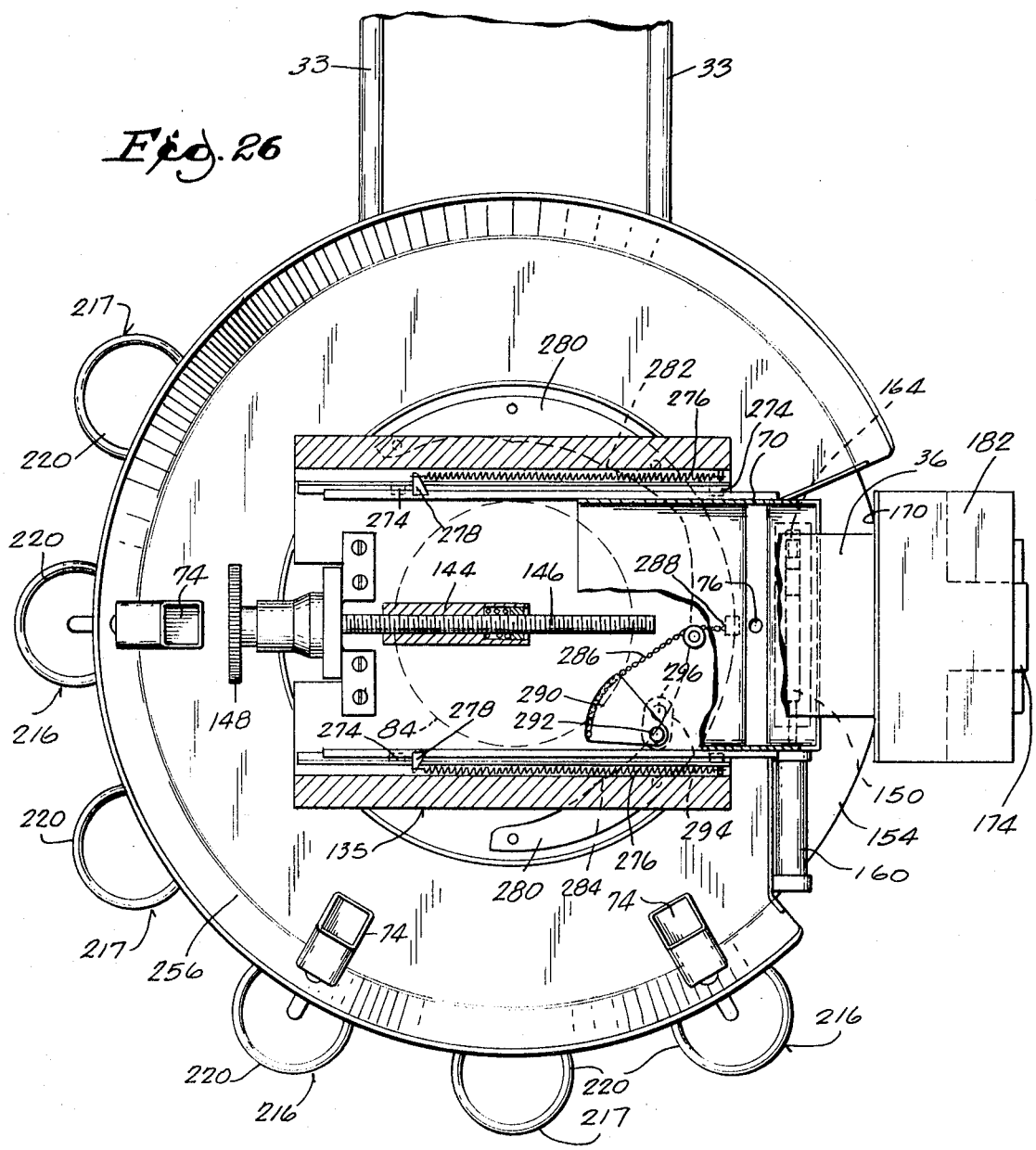

3,649,108

SERIAL SECTION PHOTOGRAPHY OF ORGANIC MATERIAL

BACKGROUND OF INVENTION

The desirability of photographing serial sections of a specimen in motion picture format has been recognized for many years. Efforts to accomplish this can be traced back to the early part of this century. These efforts were rewarded with marginal success because of the difficulties involved with aligning the individual stained sections (or slides) in precision registration with the camera.

Dr. Samuel Postlethwait, of the Dept. of Biological Sciences, and Roy Mills of the Audio Visual Center, Purdue University, conceived of photographing the block face from which the section had been cut, instead of photographing the section itself.

The feasibility of photographing the block face has since been demonstrated. The improvements herein disclosed and claimed have to do with facilitating this operation and making it practicable for educational and other uses. In referring to photographing of the block face, it is intended in this application to include any means of reproduction, including, for example, a television camera and, if desired, the magnetic tape recording of the output of the television camera.

SUMMARY OF INVENTION

The apparatus herein disclosed combines features of a large scale high precision microtome and the staining functions of a histology laboratory, and a photograph stand and controlling apparatus for automating and preprogramming the operation. The apparatus is unique in this field in its use of a rotary indexing table. This gives maximum spacing between stations in a relatively compact overall organization.

After conventional processing (i.e., fixing, dehydrating, clearing, and infiltrating) the desired specimen is normally embedded in a block of suitable supporting material such as paraffin, nitrocellulose or polyethylene glycol. A camera or cameras for routine photography, television, or other forms of reproduction have precision adjustment with respect to the block, and means is provided for cyclic relative indexing rotary movement to expose the work for sectioning and to make its cut face accessible for staining and washing. It is preferably the work rather than the camera which is indexed or otherwise moved out of the way for this purpose in the instant exemplification, although the converse is practicable.

Retractable inverted hood means is withdrawn during the intermittent operation of sectioning, and during photography, and is advanced to confine the various stains and washes and rinses which may be directed at the face of the work exposed by the sectioning operation, the stains being conventionally used to identify or emphasize features to be studied. Means is provided for catching staining and rinsing liquids. The staining liquids are preferably, though not necessarily, returned to their containers, from which they are then recirculated. The surplus rinses will normally be discharged through a drain. The staining nozzles and rinsing nozzles may be adjusted to function in any desired position or positions of indexed movement.

To permit such movement and accurately to restore the predetermined relative position of the parts, "matched face splines" with mating teeth are provided between the indexing table and the support and between the table and the indexing rack. A ram lifts the table preliminary to each indexing operation, whereby to disengage said teeth and to permit the actuation and return of the rack.

While it is the freshly cut surface of the specimen which is preferably photographed by one or more cameras, arrangements permit the severed sections (2 to 100 microns in thickness) either to be discarded or to be collected and preserved. Preservation may involve filing them in sequence on a rolled up web of polyethylene film or the like so that any particular section which the photograph shows to be of interest can be located and studied independently.

BRIEF DESCRIPTION OF DRAWINGS

FIG. 8 is an enlarged fragmentary detail view taken in section on the line 8—8 of FIG. 3.

FIG. 8A is a detail view taken in section on the line A—A of FIG. 8.

FIG. 9 is a fragmentary plan view.

FIG. 10 is a fragmentary view in axial section through the indexing mechanism, showing the indexing table in its lowered and locked position.

FIG. 11 is a sectional view taken on the line 11—11 of FIG. 10.

FIG. 12 is a view similar to FIG. 10 showing the table parts elevated to disengage the locking teeth for purposes of indexing.

FIG. 13 is a detail view taken in section on the line 13—13 of FIG. 12.

FIG. 14 is a fragmentary view taken in section on the line 14—14 of FIG. 12.

FIG. 15 is a fragmentary detail view partially in section and partially in elevation showing the ram which advances the work for a regulated distance representing the thickness of the desired section.

FIG. 16 is a view taken in section on the line 16—16 of FIG. 15.

FIG. 17 is a view taken in section on the line 17—17 of FIG. 16.

FIG. 18 is a fragmentary detail view on an enlarged scale showing the engagement of the work-advancing rack with the pinion which effects the work advance.

FIG. 19 is a view illustrating in perspective and in relatively separated positions a water tank and its mounting on the housing fragmentarily shown.

FIG. 20 is a view of the mounted tank and housing in section.

FIG. 21 is a view of the tank in front elevation.

FIG. 22 is an enlarged detail view in perspective showing one of the spray nozzles.

FIG. 23 is a view of the nozzle in cross section.

FIG. 24 is an enlarged view partially in side elevation and partially in section showing the arrangement for mounting and operating the microtome knife to cut the desired section.

FIG. 25 is a detail view taken in transverse section on the line 25—25 of FIG. 24.

FIG. 26 is a view in horizontal section through the apparatus at a level to expose the mechanism for advancing and retracting the hood which confines the work for spraying and exposes it for slicing and for photography.

DETAILED DESCRIPTION

Figure 1:
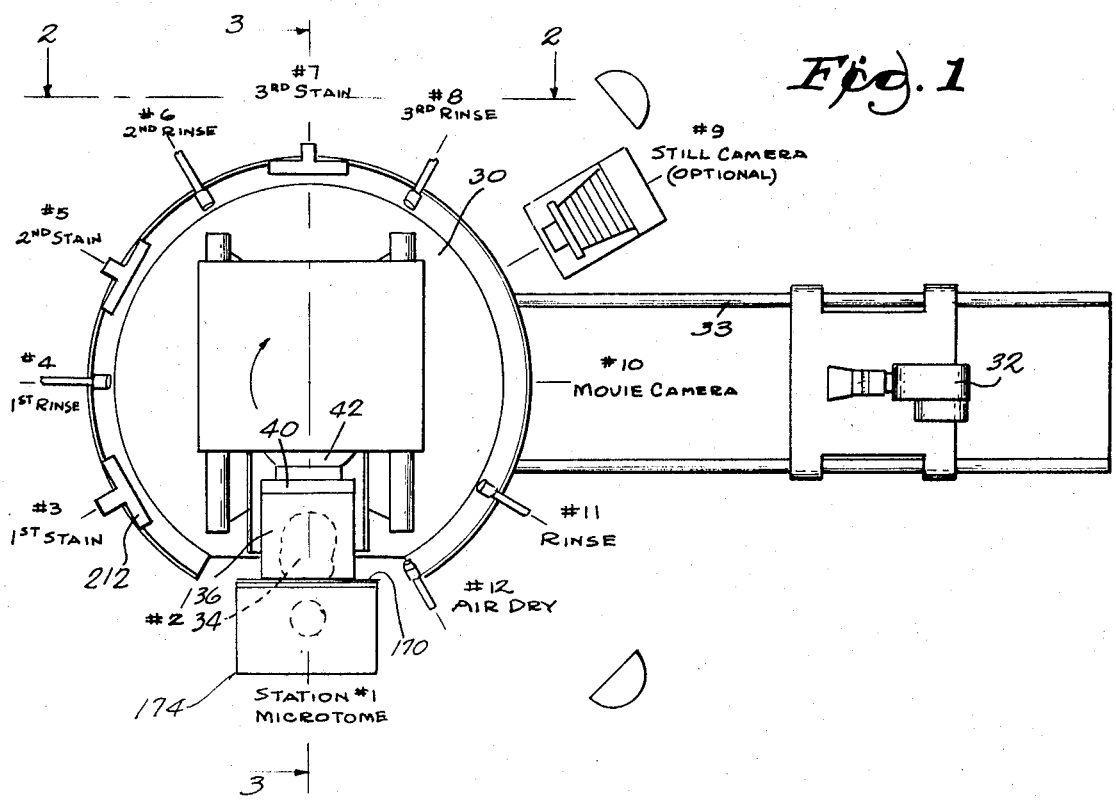
FIG. 1 is a diagrammatic plan view of the apparatus.

The machine column housing 30 is generally cylindrical. Upon it is a rotary table on which the workpiece is mounted as hereinafter described to be angularly indexed step by step with 12, more or fewer, intervening periods of dwell. At station 1 (FIG. 1) a thin section is removed from the face of the specimen. In the instant device, station 2 is an idle station at which no work is done. At station 3, and possibly stations 5 and 7, the exposed face of the specimen is stained. At stations 4, 6, 8 and 11, it is rinsed with water or other cleansing liquid.

Figure 2:
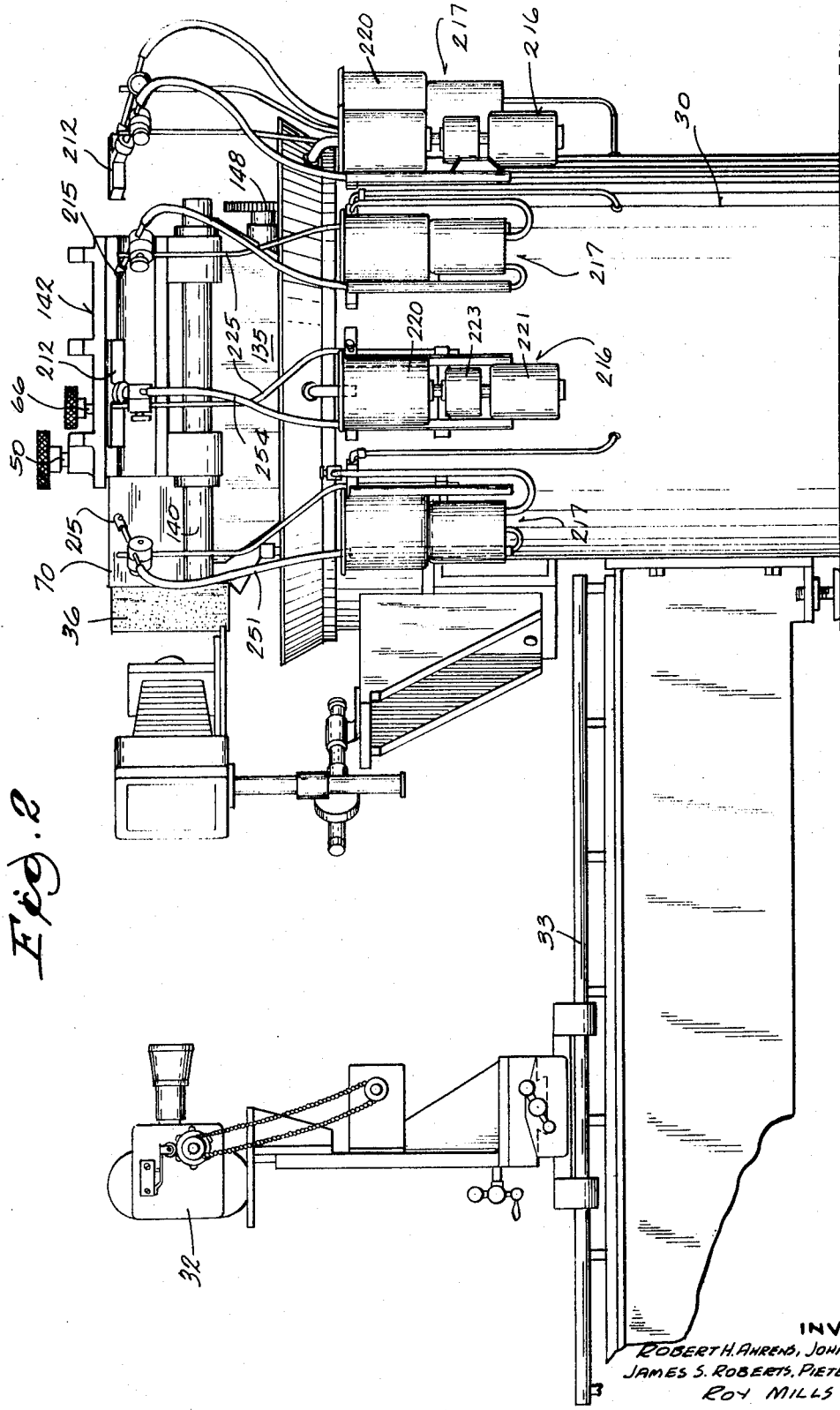
FIG. 2 is a diagrammatic side elevational view of certain components of the apparatus as they appear from the viewpoint indicated by line 2—2 of FIG. 1.

At station 9, any desired photograph is taken. At station 10, the surface is photographed upon a very few frames of film in the motion picture or animation camera 32. This is adjustable toward or from the column 30 upon a track 33 which may project radially from the column as shown in FIG. 1 and may be bolted thereto as shown in FIG. 2. Details of the preferred construction are as follows:

Preliminary to its mounting in the machine, the specimen or workpiece 34 is embedded in a block 36 of material which is susceptible to sectioning by the microtome knife. This block is keyed by ribs 38 to a mounting plate 40 attached to a ball 42 whereby it may be universally adjusted. The range of universal adjustment of the ball is small (+ or − 10°, in practice). The ball may optionally have a lens (or merely an opening) 44 which, in all ball positions, is open to the rear of the machine to permit the specimen to be backlighted if desired. The block of mounting material 36 is usually translucent or transparent material, paraffin, nitrocellulose, or polyethylene glycol being preferred.

The ball 42 is seated in a concave bed or socket at 48 (FIG. 3) and is held by a screw-pressed clamp 50 in the position to which it is adjusted by crank pins 54 and 56. These are respectively carried by nuts 58 and 60 mounted on screw shafts 62 and 64, respectively, for manipulation by handles 66 and 68 (FIGS. 8 and 9). The pins are engaged about 90° apart in the peripheral groove 69 of the ball. The arrangement is such that the work will pivot on one of the pins when it is being angularly adjusted by manipulation of the other.

A hood or shield 70 is movable between advanced and retracted positions. It is shown retracted in FIGS. 1 and 3 so that it will not interfere with the movement of the microtome knife. It is also normally retracted during photographing of the specimen to permit the illumination of the specimen with light through the side of the translucent mounting material, in addition to illumination from the front or the back (Light sources are not shown). Ambient light may be used. The means for advancing or retracting the hood or shield is best shown in FIG. 27 and will later be described.

When the face of the specimen is being stained or washed, the shield 70 is advanced to catch all overflow and confine the liquid and to deliver it to an appropriate hopper for return of the stain solution to its reservoir and return of discharge water to a drain. The advanced position of the shield is shown in dotted lines at the left in FIG. 3. Here it is in operative relation to the hopper 74, which receives the drainage from the spout 76 in the bottom of the shield.

The specimen 34 and the block 36 in which it is mounted are subject to three different types of movement in addition to its initial adjustment by oscillation of its mounting ball. There is an angular table indexing movement above mentioned; a vertical unlocking and relocking movement which accommodates the release of the indexing turntable from its accurately predetermined position and its return to a new position equally accurately fixed; and finally, there is the controllable minute radial advance of the specimen preliminary to the functioning of the microtome knife in taking a fresh section from the face of the specimen. The thickness of the section will be determined by the extent of the advance.

FEED ADVANCE OF SPECIMEN OVER KNIFE

The advancing of the specimen presents two problems: Extreme accuracy in increments of 1 micron (0.000039 inch); and wide range of 2 to 100 microns. The cycle of the index table which is up, rotate, down, leads to a simple reliable solution. The specimen is mounted on a 40 pitch lead screw with spring loaded nut, resulting in a backlash-free arrangement. Keyed to the lead screw is a 635 toothed drive gear. During the down stroke of the index table this gear is placed in mesh with a rack, preferably made of synthetic resin, and held to a positive stop by an air cylinder. Nowhere in this train is there play or backlash. Since one meter is 39.3 inches, 1 micron is 0.0000393 inch and one tooth movement is 1/40 × 635 = 0.0000393. Consequently one tooth rotation advances the work 1 micron. By placing different blocks between the rack and a positive stop, the stroke of the rack can be controlled with great accuracy from 2 to 100 microns — the limits selected for our present machine.

This structure is best shown in FIGS. 3 and 15 to 18. The lead screw 146 is engaged in a nut 144 which depends from the carriage 142, the latter being guided for movement on the supporting rails 140 mounted on a bed 135 on the turntable 84. Pre-loaded ball bushings 141 support the carriage from the shafts or rails 140. It is upon this carriage that the specimen 34 and its mounting block are positioned. As above described, a concave socket for ball seat 48 in which the ball 42 is initially adjusted is a part of the carriage 142.

To accomplish controlled rotation of the screw 146 for advancing the carriage without backlash, the screw 146 carries and is driven by a toothed involute gear pinion 148 (FIG. 15) which may be engaged with rack 150 as shown in FIG. 18 or may be raised free of the rack as shown in FIG. 17. In practice, the gear 148 has 635 teeth.

Movement of the pinion to and from engagement with the rack is effected automatically, since the rack 150 moves in a way 152 that is fixed to the top deck 154 of the column, whereas the pinion 148 moves up and down with the turntable in consequence of the movement of piston 98 above described.

The pinion 148 also rotates with the turntable. There is only one position of the turntable in which the pinion 148 will descend into mesh with rack 150 when the turntable descends. In all other positions, the pinion will be free of the rack either by virtue of the elevation of the turntable as shown in FIG. 17 or by virtue of the indexed movement of the turntable as shown, for example, in FIG. 3.

To rotate the pinion 148 and screw 146 to achieve controlled advance of the workpiece 34, there is a fluid operated ram cylinder 160 having its piston 162 connected with rack 150 as best shown in FIG. 15. Interchangeably disposed in the way 152 in the path of the rack is a spacer block or stop 164 (FIGS. 15 and 16). By substituting stop elements 164 of desired length, the movement of the rack may be predetermined with precision. There is no backlash anywhere in the drive train. In practice, the arrangement enables the minutely controlled advance of the surface of the workpiece 34 over the knife. In this particular device, the advance may be predetermined for a distance within a range of 2 to 100 microns so that the knife will cut from the exposed face of the workpiece a section of corresponding thickness.

INDEX

A base 80 is mounted on a plate 82 which spans the column housing 30. A turntable 84 is vertically reciprocable with reference to base 80 and is guided thereby for rotation. FIG. 10 shows it in its lower fixed position and FIG. 12 shows it elevated for indexing movement.

For locating with precision the indexed position of the turntable 84, mating radially toothed clutch rings 86 and 88 are provided (FIGS. 10, 12, 13 and 14). These are not gears in fact but are known commercially as "matched face splines." The ring 86 is fixed in a recess 90 of the base 80. The ring 88 is disposed in a relatively inverted position in a corresponding recess 92 of the turntable 84. The teeth 94 are formed with precision and are not comparable to gear teeth since there is no transmission of motion. In the elevated position of the turntable shown in FIG. 12, none of the teeth are in engagement. In the lower position shown in FIG. 10, all of the teeth are in engagement.

For raising and lowering the turntable and the specimen-mounting parts carried thereby, a fluid operated double-acting ram is preferably employed. Fixed in the base is a cylinder 96. The piston 98 reciprocable therein is mounted on a sleeve 100 which is both rotatable and axially movable with respect to the cylinder 96. The duct 102 communicates fluid pressure to the cylinder below the piston flange 98. The duct 104 communicates with the cylinder base above the piston. The piston sleeve 100 is keyed at 106 to the headed shaft 108 which supports the turntable 84. When the piston and shaft and turntable are elevated as shown in FIG. 12, the turntable may be indexed because the teeth 94 of the rings 86 and 88 are disengaged. In the lowered position of the parts shown in FIG. 10, no indexing movement is possible, the teeth 94 being engaged.

The indexing of the turntable is achieved by means of the rack piston 110 which moves back and forth in the cylinder 112 under fluid pressure (preferably pneumatic) communicated to it through the pressure line 114 or 116 subject to the control of a multiple valve 118 in the supply and return lines 120, 122 (FIG. 11). The teeth 124 formed in the side of the rack piston 110 mesh with the gear 126 which is keyed to the aforesaid sleeve 100. A stop 125 of accurately predetermined length projects from one end of cylinder 112 into the path of movement of the rack piston 110 to predetermine with precision the movement of which the rack piston will be capable when subjected to pressure through the line 116.

In the specific device illustrated in which there are 12 stations at which dwell occurs, the arrangement is such that each operation of the piston 110 will index the elevated turntable 84 for 30°. Thereupon the ram piston 96 will descend to engage the toothed rings 86 and 88 for a precise determination of the indexed position. In the lower position of the piston, the teeth 130 on the flange 132 of the piston sleeve 100 will be disengaged from the complementary teeth 134 on the under surface of the gear 126, as shown in FIG. 10. This will release the rotative parts from the rack and pinion 126. The pinion automatically returns to its original position without affecting the rotative parts.

After 12 successive indexed advances and dwells, the turntable will have been restored to its original position at station 1 to place the work specimen in registry with the microtome knife.

THE KNIFE MOUNTING AND ACTUATION

Figure 5:
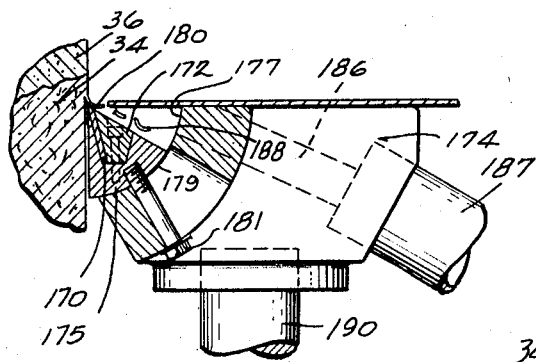
FIG. 5 is a view taken in section on the line 5—5 of FIG. 4.

The disposable knife 170 is positioned in any desired manner (as by clamp wedge 172) on a vertically reciprocable operating head 174 from which its cutting edge 176 projects slightly (FIG. 7) to sever a very thin section 180 from the mounting block 36 and the specimen 34 embedded therein. The angle of the knife 170 is pivotally adjustable on the knife carrier 174 on an axis which preferably coincides with the cutting edge 176 of the knife. The angle of the knife is adjusted by providing the knife supporting head 174 with a slotted cylindrical surface 177 coaxial with the knife at 176 and upon which the complementary surface 179 of the knife supporting member 175 is held by bolts 181 projecting through the slots as best shown in FIG. 5.

Figure 4:
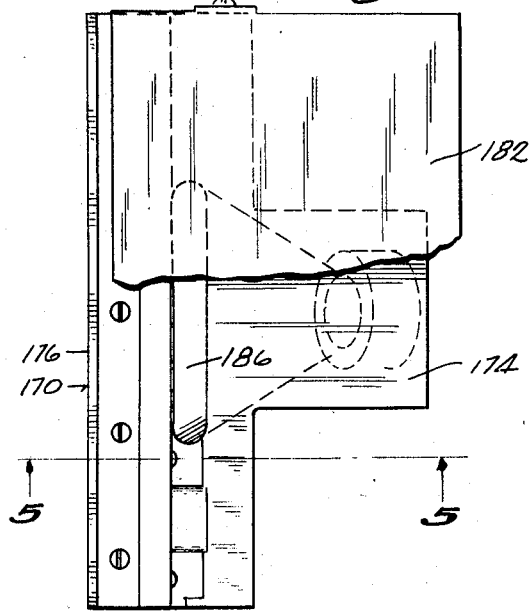
FIG. 4 is a fragmentary plan view of the microtome apparatus in plan, the apparatus being shown equipped with a vacuum tube for optionally withdrawing sections which are to be discarded.
Figure 6:
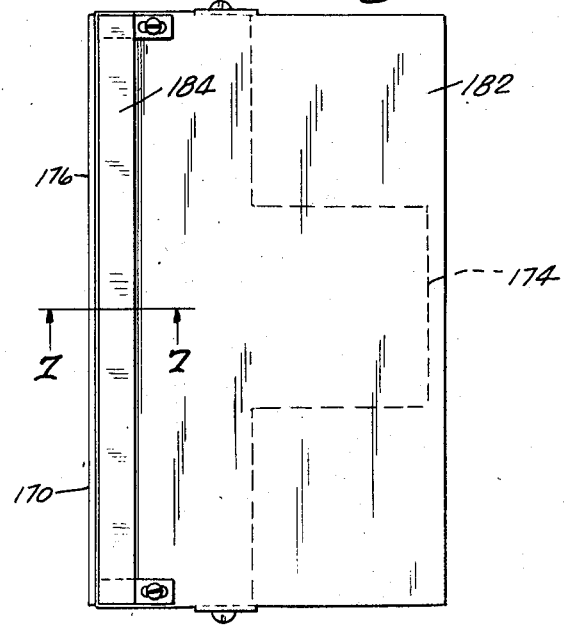
FIG. 6 is a view of the microtome apparatus in plan, the structure here shown being designed for use when the severed sections are to be retained and filed.
Figure 7:
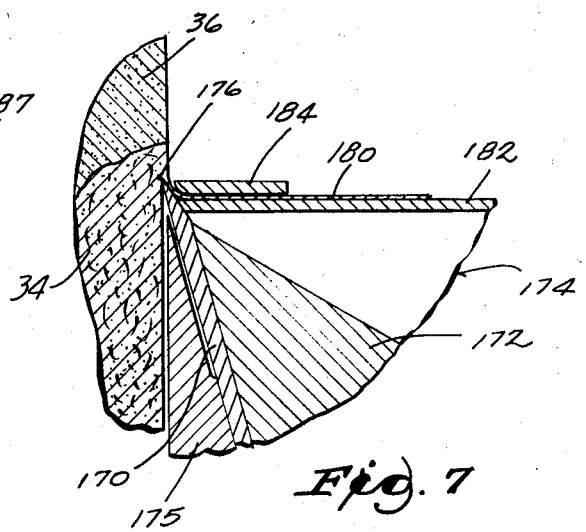
FIG. 7 is a view taken in section on the line 7—7 of FIG. 6.

If the severed material is to be saved, the section 180 is guided onto a table surface 182 on the head 174 and is desirably confined beneath a decurler bar 184 as shown in FIG. 7. If it is not to be saved, it is subject to the suction of a vacuum nozzle 186 and pipe 187 as shown in FIGS. 4 and 5. The air flow tends to break it into small fragments as shown at 188 of FIG. 5.

Figure 3:
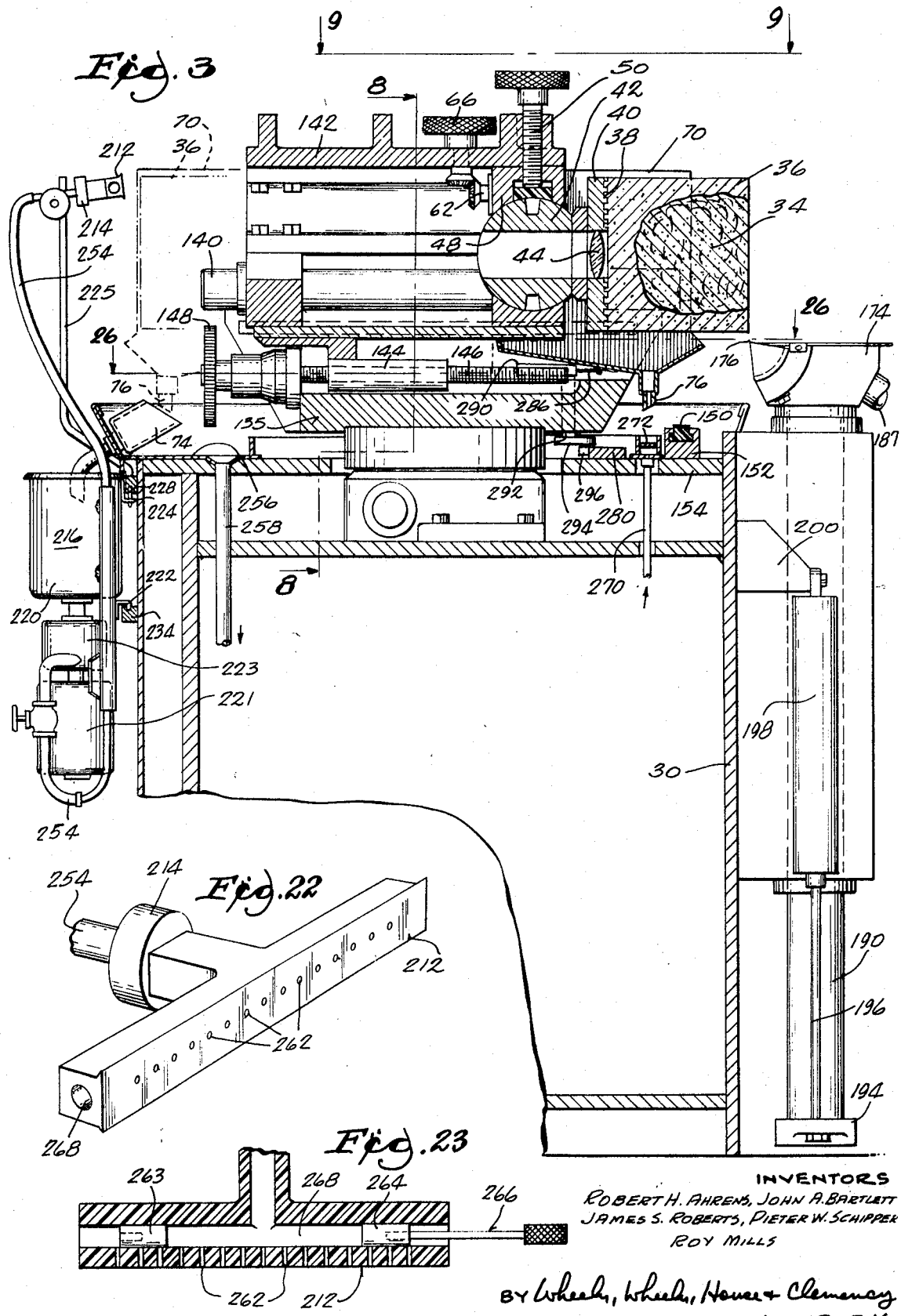
FIG. 3 is a view on a larger scale showing the apparatus in section on the line 3—3 of FIG. 1.

The knife supporting head 174 is guided for movement on a vertically reciprocable post 190 (FIGS. 3 and 24) for which the column housing 30 provides a bearing at 192. The bar 190 supports a cross yoke 194 having connected to each of its ends a piston rod 196 of one of a pair of rams 198 suspended from brackets 200 which project outwardly from the column 30 (FIG. 3). When pressure is applied to the rams 198 below the pistons 196, the pistons will rise in the rams to force the bar 190 and the head 174 upwardly to effect the sectioning operation shown in FIG. 7.

Since great accuracy is required, the column housing is provided with ways 201 (FIG. 25) engaged by socketed bearing elements 202. Preferably the bearing elements are simply disks which ride on the respective ways and are carried by a bracket 204 attached to the posts 190. At one side of the post, the bracket is provided with a pin 206 biased by spring 208 against one of the bearing disks 202. At the other side of the post, the thrust screw 210 is threadedly adjustable in bracket 204 into engagement with the other of the bearing disks. For slight angular adjustment of the position of the post 190 and the knife carried thereby, it is only necessary to rotate the screw 210 inwardly or outwardly as required. The spring biased pin 206 accommodates this movement so that adjustment of only one screw is necessary.

STAINING AND WASHING

After a very thin section has been cut with knife edge 176 from the workpiece 34 and the embedding block 36, the exposed face of the workpiece is treated with a stain or stains appropriate to bring out the feature or features under investigation. The first such stain is applied by jetting it from a nozzle 212 (FIG. 2) against the workpiece when the workpiece dwells at station 3 (station 2 is not used in this particular device). FIGS. 22 and 23 show a typical nozzle 212. It is an elongated device preferably made of a silicone resin to minimize adhesion of chemicals to it. It has a coupling at 214 for a pipe 254 which supplies the stain from a pressurizing pump as hereafter described.

The equipment is made adaptable enough to meet all requirements by detachably securing pods 216 and 217 to the housing or column 30 at desired angularly spaced locations. This is conveniently done as shown in FIGS. 2, 3, 19 and 20. The pods 216 have receptacles 220 for stain, and motor-driven pumps for delivering the stain through the nozzles 212. The pods 217 operate under conventional water pressure and hence require no pumps. Desirably their receptacles are similar to the tanks of pods 216 and the design is such that these may contain water softener or solvents to be injected into the water supplied from the city system. Both sets of pods are mounted similarly on the column.

Each pod is provided at its rear with a generally horizontal elongated inverted channel-shaped hook 222, above which there is an apertured angle flange 224. The manifold 226 on the housing 30 has a downwardly projecting peg 228 receivable into the aperture of the angle fitting 224. It has length enough to maintain engagement between the parts when the pod is lifted so that the flange of channel 222 can go into the slot 230 provided in the bracket 234 on the side wall of the housing (FIGS. 19 and 20).

A typical construction of pods 216 is shown in FIGS. 2 and 3, each such pod including a reservoir 220. A motor 221 drives a pump 223 which withdraws stain from the reservoir 220 and delivers it through the pipe 254 to the nozzle 212. The nozzle is supported by a bracket arm 225. As already explained, any surplus stain draining from the workpiece is intercepted by the shield 70, the spout 76 of which returns the stain through hopper 74 to the registering receptacle 220 from which it was pumped.

In order to cover the entire surface of the work, the nozzles 212 are provided with numerous delivery orifices 262 spaced lengthwise of the nozzle as shown in FIGS. 22 and 23. The plugs 263 and 264 can be adjusted by tool 266 lengthwise of the nozzle passage 268 to control the number of discharge orifices 262 which are left available for jetting liquid against the work according to the width of the block face which is to be stained.

Pods 217 used for rinsing do not require motors or pumps or special nozzles. Their nozzles 215 are supplied with water under pressure from city lines, the water being conveyed to the pod by the hoses 245. Subject to the control of valves 247 (FIG. 19) the water passes through a tube 250 into an aspirator 244 which entrains any desired liquid 241 from the tank 220, such liquid passing through the pipe 240 and the flow water sight glass 238 and the pipe 242 to the aspirator 244. The mixture then passes through pipe 246 and sight glass 248 and through the tube 251 to the nozzle 215 (FIGS. 2 and 21).

To keep the tray or pan 256 clean, it is desirable that it be flushed. This is conveniently done by water discharged into the pan 256 through a flushing pipe 270 (FIG. 3). The issuing rinse water is held close to the surface of the pan by means of a baffle 272. In praCtice, the rinse water is permitted to flow continuously through the supply pipe 270 and out the drain pipe 258 as long as the device is in operation.

REGULATION OF POSITION OF THE SHIELD

Reference has been made to the fact that the work is partially enclosed within a shield 70 when either stain or rinse water is being discharged onto the work. The shield is shown in a retracted position in FIGS. 1, 2, 9 and 26. FIG. 3 also shows the shield retracted at the right in FIG. 3 but shows it in dotted lines in its advanced position at the left in FIG. 3. It will be understood that the hood is advanced at all times during spraying and rinsing and is retracted during the sectioning and, preferably, also during photography. In its advanced position, it either encloses the work face or is only about one-tenth of an inch behind the work face. During sectioning or photography, the shield is withdrawn so that its leading part is perhaps 3 inches more or less behind the work face.

As is best shown in FIG. 8, we provide guide rollers 274 upon which the shield 70 moves for advance and retraction. The shield 70 is advanced by the bias of tension springs 276 (FIG. 26). As shown, these springs are anchored at the right and connected to the shield 70 by means of pins 278.

Fixed to the top deck 154 is a cam 280 (FIGS. 3 and 26) which has relatively high points at 282 and 284. A bead chain 286 connected at 288 with the shield 70 passes about a segmental pulley 290 which is mounted for pivotal movement on a rock shaft 292 which carries a crank 294 supporting a cam follower 296 engaged with the inner margin of the cam 280. The bias of the tension springs 276 holds the cam follower tightly against the cam. When the cam follower rides over the high points 282 or 284 of the cam, the shield 70 is retracted against the bias of springs 276. As the cam follower leaves the high points of the cam or passes completely from the cam the shield is retracted by its biasing springs to avoid interference with the sectioning knife, or to admit light laterally to the translucent block 36 in which the workpiece is mounted, as shown in FIG. 3.

By reason of the arrangement whereby all desired operations are achieved during the rotative intermittent or step by step angular advance of the work upon a turntable, the device is highly versatile and can be adjusted to permit any desired time for staining or rinsing, for drying, for photographing, and for the microtome severance of successive sections. Once the timing is fixed, the desired values of the operation will repeat themselves cyclically indefinitely without attention.

It will be understood, of course, that practically all of these operations are controlled in a conventional manner by a timer, not shown. The timer will turn the stain jetting pumps and rinse jets on and off in proper sequence and for desired periods; will actuate the cameras; will operate the microtome knife forth and back when the work is registered therewith; and will actuate the table indexing mechanism, indirectly retracting or advancing the shield as dictated by the cam.

The machine produces more accurate results than any previously available machine because, at the time the section face is photographed or viewed, it is still supported. For the same reason, the knife will take a thinner section than has heretofore been practical.

Using known integrating equipment, it is possible to compare the color of various portions of the work to determine such factors as the relative proportion of voids to solids, and the area and number of cells.

We claim:

1. A microtome device comprising, in combination, a bearing establishing a center of rotation, a mounting for a workpiece having a radially exposed face, means for sectioning the workpiece and including a microtome knife and mechanism for actuation thereof; camera means; said sectioning means and camera means being angularly spaced about said center of rotation and means for presenting said exposed face successively to said first and second means by effecting relative indexing rotation about said center between the workpiece and the first and second means, the means with respect to which the workpiece has relative indexing rotation including a third means comprising a nozzle for directing stain against the exposed sectioned face of the workpiece in advance of presentation of said exposed face to said camera means.

2. A combination according to claim 1 in which the first, second and third means have mounts upon which they are fixed, and a turntable supported for rotation about said center is provided with said mounting for said workpiece.

3. A combination according to claim 2 in which the bearing establishing the center of rotation is on a column, the column and the table having matched-face gears axially engageable and disengageable, and means for periodically elevating the table to disengage said gears and for thereafter indexing the table, and means for lowering the table to reengage said gears when the table is in positions to register the workpiece respectively with the first, second and third said means.

4. A combination according to claim 1 including stain propelling means leading to the nozzle and in which said turntable includes a shield having means mounting it for forth and back radial adjustment between retracted and forward positions, said shield having portions adapted in a forward position to at least largely embrace the workpiece to retain spray directed thereon by said nozzle, the stain propelling means including a stain tank, a motor-driven pump, and hose connections for discharging stain from the tank through the nozzle, said shield having a discharge spout for the delivery of collected liquid, and said tank having a receiving hopper which registers with said spout to receive collected liquid in the position of the turntable in which the work registers with the nozzle.

5. A combination according to claim 4 in which cam and cam follower means respectively interacting in the course of turntable rotation have driving connections for advance and retraction of said shield and are adapted to advance the shield before the propelling means is operative and to retract the shield before the camera means and the sectioning means are operative.

6. A microtome device comprising, in combination, a bearing establishing a center of rotation, a mounting for a workpiece having a radially exposed face, means for sectioning the workpiece and including a microtome knife and mechanism for actuation thereof; camera means; said sectioning means and camera means being angularly spaced about said center of rotation and means for presenting said exposed face successively to said first and second means by effecting relative indexing rotation about said center between the workpiece and the first and second means, the mounting for the workpiece including a slide movable along a radius of said center, and means for periodically moving said slide radially past said knife for an amount equal to the thickness of the section to be cut by said knife in further combination with a turntable having a way upon which said slide is movable, means for indexing the turntable, means for locking the turntable in at least one indexed position, means for axially elevating the turntable from a normal lower position to a raised position to disengage said locking means in advance of indexing movement from said one position, a lead screw on the turntable, a nut on the slide which meshes with the screw, means for rotating the screw and including a drive gear thereon, a rack having a way provided by the turntable, said drive gear meshing with said rack in the lower position of the turntable and being elevated free thereof when the turntable is raised, and means for advancing the rack for a predetermined distance along the last mentioned way for effecting rotation of said lead screw to advance said slide and the work mounted thereon.

7. A microtome device comprising, in combination, a bearing establishing a center of rotation, a mounting for a workpiece having a radially exposed face, means for sectioning the workpiece and including a microtome knife and mechanism for actuation thereof; camera means; said sectioning means and camera means being angularly spaced about said center of rotation and means for presenting said exposed face successively to said first and second means by effecting relative indexing rotation about said center between the workpiece and the first and second means, the mounting for the workpiece including a ball to which the workpiece is fixed, and a socket in which said ball is adjustably mounted, said ball having an opening for the backlighting of the workpiece, and a translucent, sectionable material connecting the workpiece with the ball.

8. A combination according to claim 7 in which a lens controls diffraction of light through said opening.

9. A microtome device comprising, in combination, a bearing establishing a center of rotation, a mounting for a workpiece having a radially exposed face, means for sectioning the workpiece and including a microtome knife and mechanism for actuation thereof; camera means; said sectioning means and camera means being angularly spaced about said center of rotation and means for presenting said exposed face successively to said first and second means by effecting relative indexing rotation about said center between the workpiece and the first and second means, said column being provided at angularly spaced intervals with pods, each of which includes a tank of liquid and a spray nozzle with which the workpiece will register in successive indexed positions of the turntable, and means for jetting liquid from a respective pod through its spray nozzle and upon the sectioned face of the workpiece registering therewith.

10. A device according to claim 9 in which the respective pod is adapted to jet stain upon the face of the workpiece and includes a stain propelling pump having an output connected with said nozzle, said last mentioned pod being so positioned on the column that the workpiece will register therewith after being sectioned and before the sectioned face registers with the camera.

11. A combination according to claim 9 in which the pod and column have relatively separable elements for the detachable mounting of the pod upon the column.

* * * * *